(12) United States Patent
Park (10) Patent No.: US 9,902,290 B2
(45) Date of Patent: Feb. 27, 2018

(54) REVERSE EQUIPMENT FOR MOTORCYCLE

(71) Applicant: Baek In Lee, Daejeon (KR)

(72) Inventor: Soun-Hwa Park, Daejeon (KR)

(73) Assignee: Baek In Lee, Daejeon (KR)

( * ) Notice: Subject to any disclaimer, the term of this patent is extended or adjusted under 35 U.S.C. 154(b) by 112 days.

(21) Appl. No.: 14/439,231

(22) PCT Filed: Sep. 22, 2014

(86) PCT No.: PCT/KR2014/008785
§ 371 (c)(1),
(2) Date: Apr. 29, 2015

(87) PCT Pub. No.: WO2015/046838
PCT Pub. Date: Apr. 2, 2015

(65) Prior Publication Data
US 2015/0306976 A1    Oct. 29, 2015

(30) Foreign Application Priority Data

Sep. 30, 2013   (KR) .................. 10-2013-0116722

(51) Int. Cl.
*B60L 15/20* (2006.01)
*B60K 17/08* (2006.01)
(Continued)

(52) U.S. Cl.
CPC .............. *B60L 15/20* (2013.01); *B60K 17/08* (2013.01); *B62M 7/12* (2013.01); *B62M 11/06* (2013.01);
(Continued)

(58) Field of Classification Search
USPC ............................................... 318/3
See application file for complete search history.

(56) References Cited

U.S. PATENT DOCUMENTS

| 4,763,538 A | * | 8/1988 | Fujita | B62K 23/06 |
| | | | | 123/179.25 |
| 4,827,148 A | * | 5/1989 | Hirosawa | F02N 11/08 |
| | | | | 290/38 R |

(Continued)

FOREIGN PATENT DOCUMENTS

| KR | 20-0390794 Y1 | 7/2005 |
| KR | 10-2013-0043603 A | 4/2013 |

OTHER PUBLICATIONS

International Search Report for PCT/KR2014/008785 dated Dec. 17, 2014 from Korean Intellectual Property.

*Primary Examiner* — Eduardo Colon Santana
*Assistant Examiner* — Devon Joseph
(74) *Attorney, Agent, or Firm* — Revolution IP, PLLC (57) ABSTRACT

Disclosed is a reversing device for a motorcycle, including: a housing having first and second output holes; a first output shaft installed in the housing through the first output hole; a second output shaft installed in the housing through the second output hole; a motor supplying power to the first output shaft or the second output shaft; a first solenoid supplying operating power to the first output shaft; a second solenoid supplying operating power to the second output shaft; a decelerating part decelerating the power of the motor to transmit the decelerated power to the second output shaft; and a controller transmitting a driving signal to the motor, the first solenoid or the second solenoid.

8 Claims, 8 Drawing Sheets

(51) Int. Cl.
 *B62M 7/12* (2006.01)
 *B62M 11/06* (2006.01)
 *F16H 61/00* (2006.01)
 *F16H 3/30* (2006.01)

(52) U.S. Cl.
 CPC ..... F16H 61/0021 (2013.01); F16H 61/0031 (2013.01); *F16H 3/30* (2013.01); *Y02T 10/7258* (2013.01)

(56) References Cited

U.S. PATENT DOCUMENTS

| | | | | |
|---|---|---|---|---|
| 4,920,825 | A * | 5/1990 | Okazaki | F02F 7/0046 123/195 C |
| 6,054,826 | A * | 4/2000 | Murakami | B60L 3/04 318/434 |
| 6,820,513 | B1 * | 11/2004 | Chen | F16H 3/14 74/347 |
| 2002/0038578 | A1 * | 4/2002 | Nonaka | B60K 31/042 74/661 |
| 2009/0126522 | A1 * | 5/2009 | Albulushi | F16H 3/089 74/329 |

* cited by examiner

REVERSE EQUIPMENT FOR MOTORCYCLE

CROSS REFERENCE TO PRIOR APPLICATIONS

This application is a National Stage Application of PCT International Patent Application No. PCT/KR2014/008785 filed on Sep. 22, 2014, under 35 U.S.C. §371, which claims priority to Korean Patent Application No. 10-2013-0116722 filed on Sep. 30, 2013, which are all hereby incorporated by reference in their entirety.

TECHNICAL FIELD

The present invention relates to a reversing device for a motorcycle, and more particularly, to a reversing device for a motorcycle that is disposed on a connection hole of a primary chain case from which a starter motor of a general motorcycle is separated, thus selectively supplying starting power and reversing power.

BACKGROUND ART

Generally, a large-sized two-wheeled vehicle like a motorcycle (the Harley touring motorcycle) does not have any reversing mechanism. Since the number of mechanical devices mountable on the two-wheeled vehicle is restrictedly provided, no reversing device exists, which makes a driver feel uncomfortable while he or she is driving the vehicle.

For example, if the motorcycle is parked on a narrow place or driven from the parking place, it should be repeatedly driven in forward and reverse directions until moves to a desired position.

At this time, if the motorcycle is driven on a slope, a large force is needed, and frequently, the motorcycle falls down, while losing its balance. Such difficulties become serious in case of the Harley touring motorcycle.

So as to remove the above-mentioned problems, there have been proposed various reversing transmissions or gears for a motorcycle. One of conventional reversing devices is disclosed in Korean Utility Model Application No. 20-0390794 entitled 'reversing gear for motorcycle'.

However, the conventional reversing transmissions or gears for a motorcycle are complicated in structures, and further, it is hard for a driver to conduct a manipulation procedure for reversing.

For example, gear shifting is first conducted to a neutral direction, and next, a reverse lever mounted on a gearbox or around a transmission is manipulated to conduct the gear shifting to a reverse direction. After that, a clutch lever mounted on a handle bar is slowly released to allow the motorcycle to be driven reversely. In this case, the reversing is possible only when the engine is turned on.

In the conventional reversing transmissions or gears, like this, the manipulation procedure is complicated, and as mentioned above, it is very hard to park the motorcycle on a narrow place wherein the motorcycle is repeatedly driven in forward and reverse directions. Accordingly, the reversing mechanism exists, but it becomes useless.

Another conventional reversing device for a motorcycle has been disclosed in Korean Patent Laid-Open Application No. 10-2013-0043603 (on Apr. 30, 2013, entitled 'reversing mechanism for motorcycle and two-wheeled vehicle having the same').

Generally, the reversing device for the motorcycle has a starter motor providing power to start an engine and a motor providing power required for reversing the motorcycle, thus making it difficult to reduce the size thereof and the number of parts thereof.

Accordingly, there is a need for developing a reversing device for a motorcycle that is simple in configuration and easy in manipulation.

DISCLOSURE

Technical Problem

Accordingly, the present invention has been made in view of the above-mentioned problems occurring in the prior art, and it is an object of the present invention to provide a reversing device for a motorcycle that is disposed on a connection hole of a primary chain case from which a starter motor of a general motorcycle is separated, thus selectively supplying starting power and reversing power.

Technical Solution

To accomplish the above-mentioned object, according to the present invention, there is provided a reversing device for a motorcycle, including: a housing having a first output hole and a second output hole formed thereon; a first output shaft appearing and disappearing from and into the housing through the first output hole, transmitting starting power to a starting sprocket, and having a first output gear fitted thereto; a second output shaft appearing and disappearing from and into the housing through the second output hole, transmitting reversing power to a rear wheel sprocket, and having a second output gear fitted thereto; a motor supplying power to the first output shaft or the second output shaft; a first solenoid supplying operating power to the first output shaft to connect or separate the first output gear and the starting sprocket to each other or from each other; a second solenoid supplying operating power to the second output shaft to connect or separate the second output gear and the rear wheel sprocket to each other or from each other; a decelerating part decelerating the power of the motor to transmit the decelerated power to the second output shaft; and a controller transmitting a driving signal to the motor, the first solenoid or the second solenoid in accordance with manipulation signals inputted from a manipulating part.

According to the present invention, preferably, the first output hole protrudes outward from the housing in such a manner as to be inserted into a connection hole of a primary chain case.

According to the present invention, preferably, the first output shaft is longer in length than the second output shaft, and the first output shaft is extended from the first output hole in such a manner as to be inserted into the primary chain case.

According to the present invention, preferably, the housing has a guide block disposed to face the second output hole in such a manner as to be spaced apart from the second output hole and a guide hole formed on the guide block in such a manner as to insert the second output shaft thereinto.

According to the present invention, preferably, the housing includes a first mounting groove adapted to mount the motor thereon, a second mounting groove adapted to mount the first solenoid thereon and to form the first output hole thereon, and a third mounting groove adapted to mount the decelerating part and the second solenoid thereon and to form the second output hole thereon.

According to the present invention, preferably, the power of the motor is transmitted to the second output shaft through the first output shaft and the decelerating part.

According to the present invention, preferably, the first output shaft has a transmitting gear fitted thereto in such a manner as to connected to a driving gear mounted on the rotary shaft of the motor so as to transmit the power of the motor to the decelerating part, and the transmitting gear is fitted to the first output shaft by means of a first spline gear.

According to the present invention, preferably, the decelerating part includes a first decelerating gear connected to the transmitting gear, a second decelerating gear fitted to the rotary shaft of the first decelerating gear, a third decelerating gear connected to the second decelerating gear, a fourth decelerating gear fitted to the rotary shaft of the third decelerating gear, and a fifth decelerating gear connected to the fourth decelerating gear and connected to the second output shaft by means of a second spline gear.

According to the present invention, preferably, the second output shaft has a locking projection formed thereon and an elastic member interposed between the locking projection and the fifth decelerating gear.

According to the present invention, preferably, the controller includes a speed controlling part adapted to control the quantity of power supplied to the motor and to maintain the reversing speed of the motorcycle to a given speed, and the speed controlling part is controlled with a speed signal sensed by means of a speed sensor transmitting the speed signal to the controller.

Advantageous Effects

According to the present invention, the reversing device for the motorcycle selectively provides the starting power for starting the engine and the reversing power for driving the motorcycle reversely by means of one motor, thus reducing the number of parts thereof and saving the manufacturing cost thereof.

Further, the reversing device for the motorcycle according to the present invention is configured to have the motor and the pair of solenoids mounted on one side surface of the housing and the first output shaft and the second output shaft appearing and disappearing from and into the other side of the housing by means of the operations of the solenoids, thus selectively transmitting the power to the rear wheel sprocket and the starting sprocket, so that the starting power and the reversing power can be selectively supplied in the simple structure to reduce the size of the device.

Furthermore, the reversing device for the motorcycle according to the present invention is configured wherein the power of the motor is decelerated by means of the operation of the decelerating part having the plurality of gears and transmitted to the rear wheel sprocket, thus maintaining the reversing speed of the motorcycle to an appropriate speed and preventing the collision accidents of the motorcycle.

Additionally, the reversing device for the motorcycle according to the present invention is configured wherein the number of parts is reduced and the whole size thereof is decreased, so that instead of the housing of the existing starter motor mounted on the motorcycle, the reversing device having the housing according to the present invention is mounted to allow the starting and reversing operations to be selectively conducted.

Moreover, the reversing device for the motorcycle according to the present invention is configured wherein the reversing power is provided by means of the power supplied from the motor in the state where the starting of the engine is finished, so that the reversing operation can be easily conducted on a narrow road or a parking lot by means of the simple manipulation of a knob mounted on the handle bar of the motorcycle.

In addition, the reversing device for the motorcycle according to the present invention is configured to have the speed controlling part adapted to control the quantity of power supplied to the motor, thus controlling the output of the motor in accordance with the rotating speeds of the rear wheel transmitted from the speed sensor and conducting the reversing at a stable speed irrespective of the shapes of roads on which the motorcycle is driven.

BEST MODE FOR INVENTION

Hereinafter, an explanation on a reversing device for a motorcycle according to the present invention will be in detail given with reference to the attached drawings.

In the description, the thicknesses of the lines or the sizes of the components shown in the drawing may be magnified for the clarity and convenience of the description.

Further, the terms as will be discussed later are defined in accordance with the functions of the present invention, but may be varied under the intention or regulation of a user or operator.

Therefore, they should be defined on the basis of the whole scope of the present invention.

Figure 1:
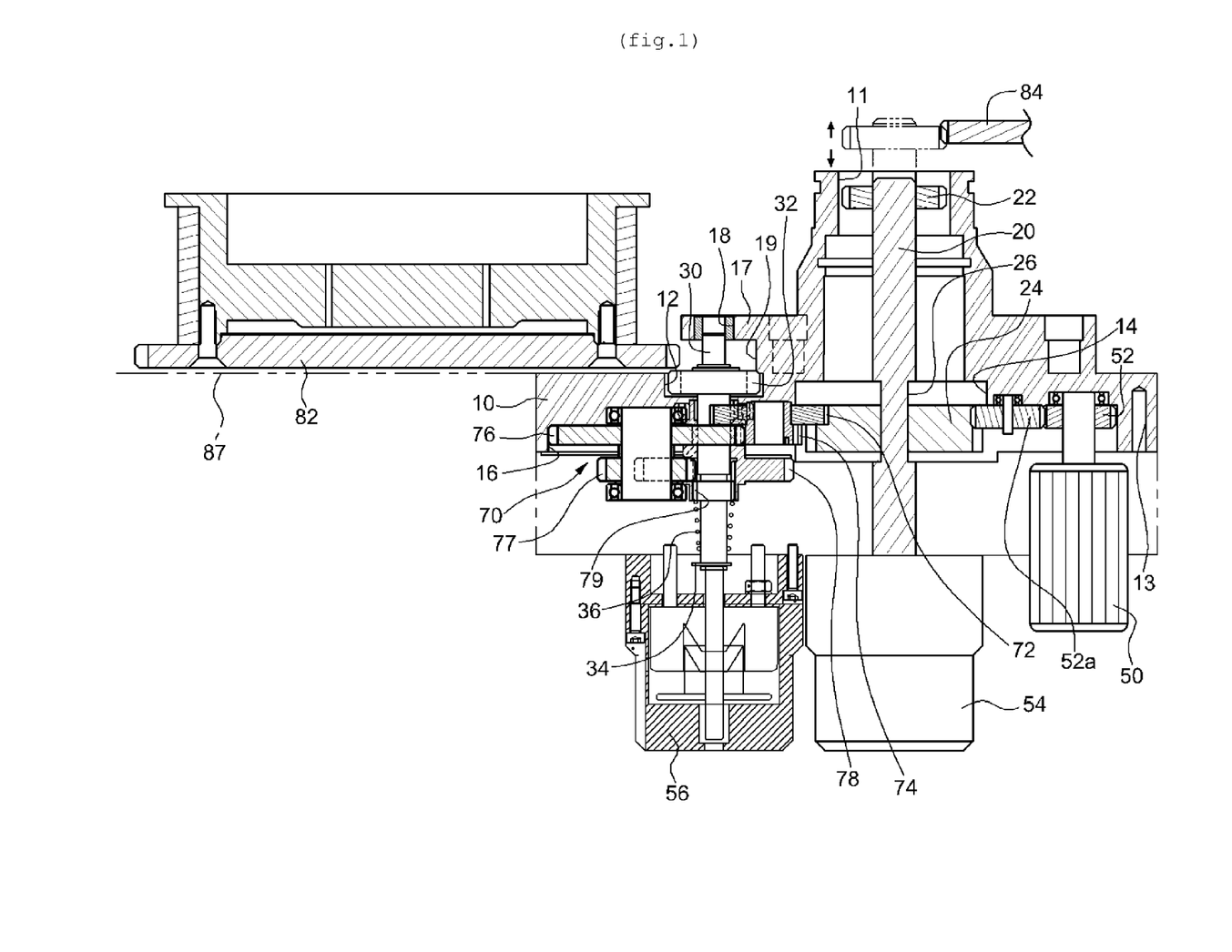
FIG. 1 is a sectional view showing a reversing device for a motorcycle according to the present invention.
Figure 2:
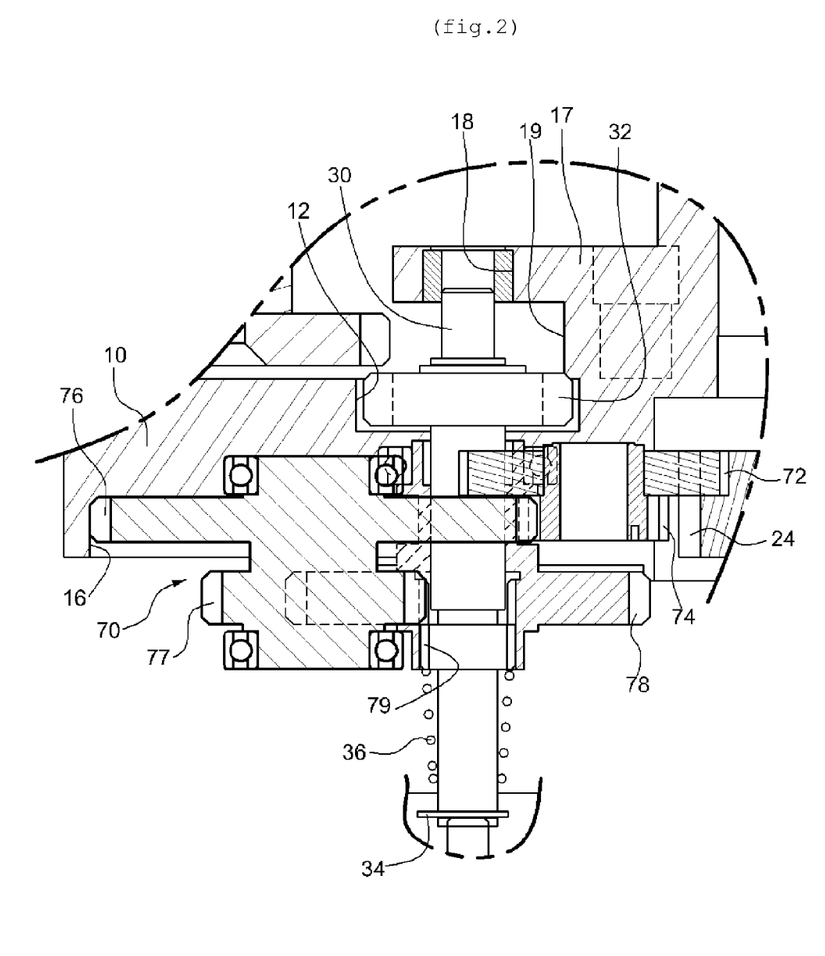
FIG. 2 is a sectional view showing a structure wherein a second output shaft and a decelerating part are connected in the reversing device for a motorcycle according to the present invention.
Figure 3:
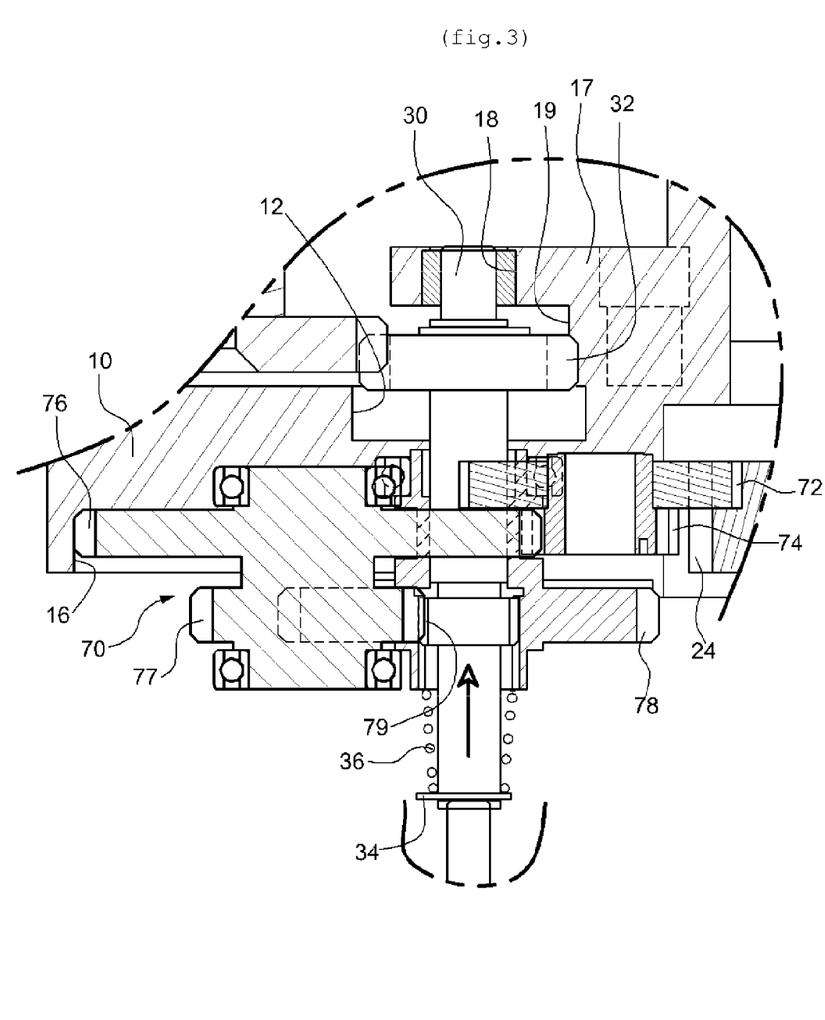
FIG. 3 is a sectional view showing an operating state of the second output shaft in the reversing device for a motorcycle according to the present invention.

FIG. 1 is a sectional view showing a reversing device for a motorcycle according to the present invention, FIG. 2 is a sectional view showing a structure wherein a second output shaft and a decelerating part are connected in the reversing device for a motorcycle according to the present invention, and FIG. 3 is a sectional view showing an operating state of the second output shaft in the reversing device for a motorcycle according to the present invention.

Figure 4:
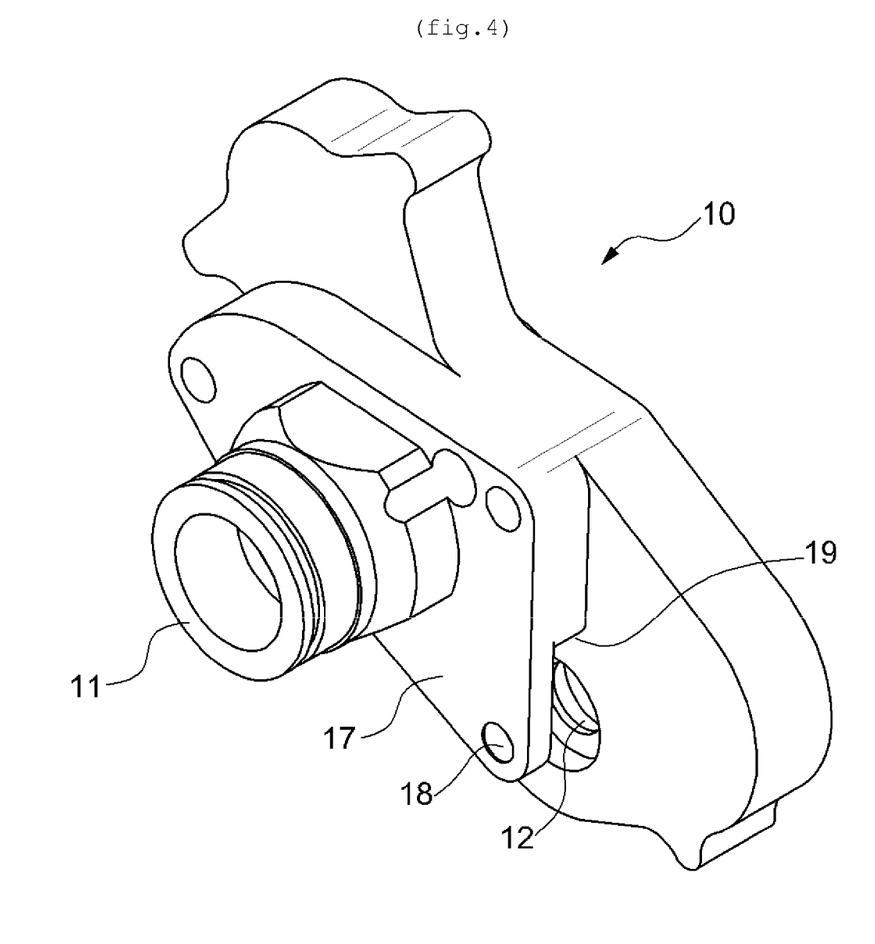
FIG. 4 is a front perspective view showing a housing of the reversing device for a motorcycle according to the present invention.
Figure 5:
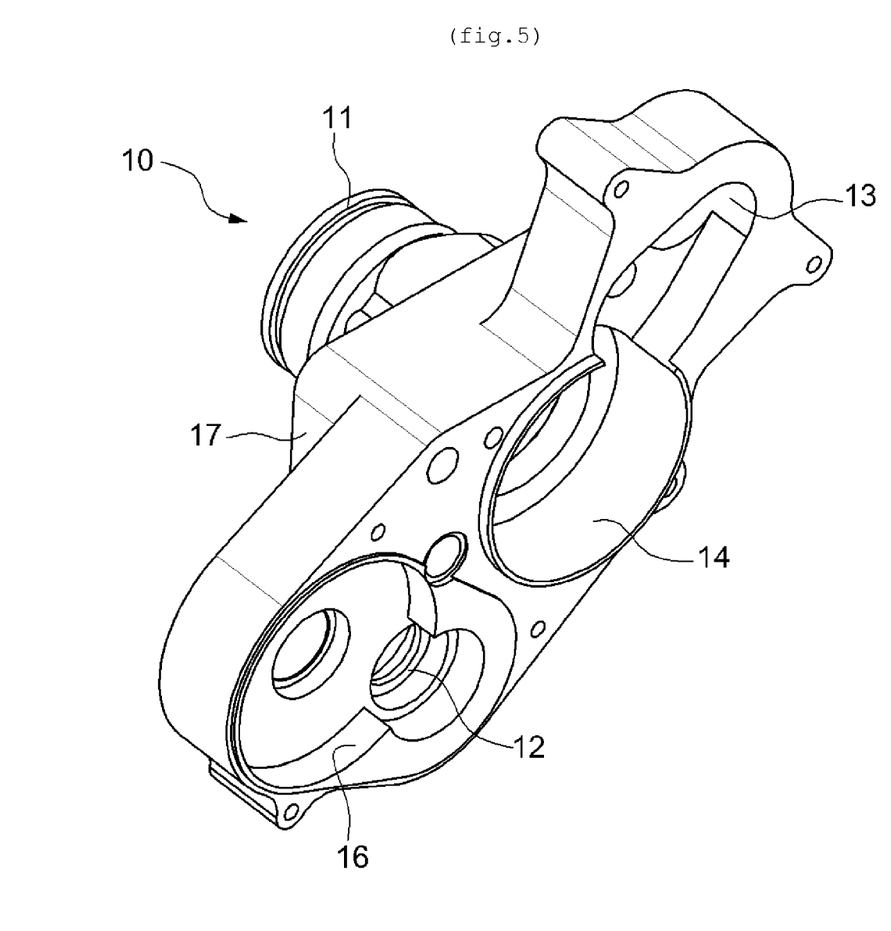
FIG. 5 is a rear perspective view showing the housing of the reversing device for a motorcycle according to the present invention.
Figure 6:
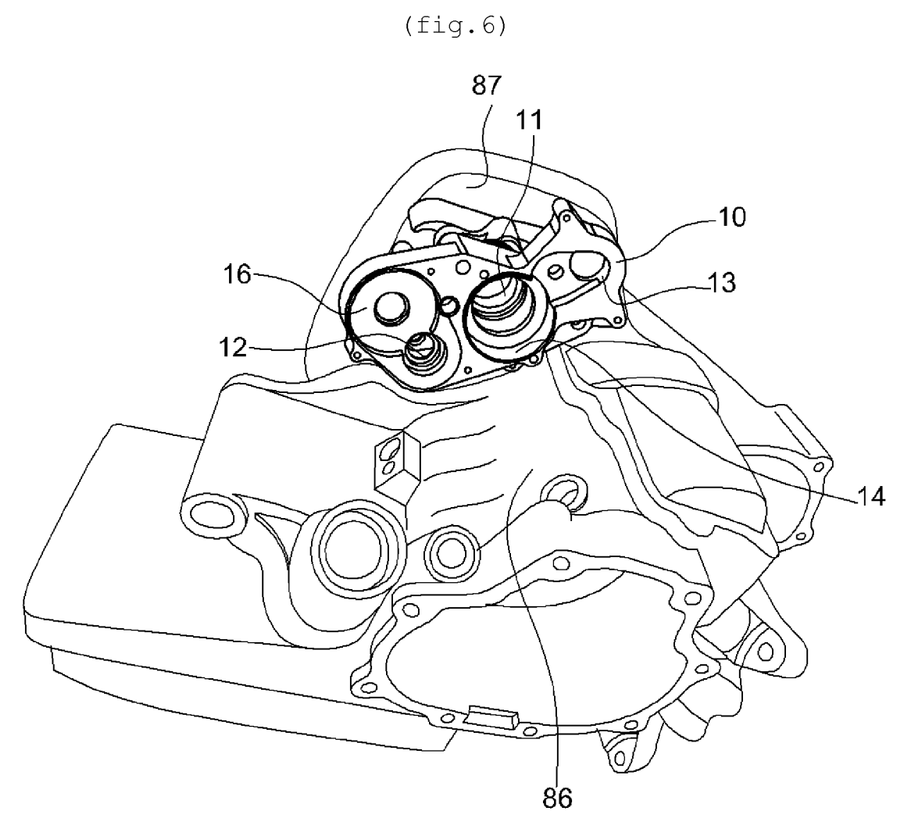
FIG. 6 is a perspective view showing a structure for mounting the housing of the reversing device for a motorcycle according to the present invention.

Further, FIG. 4 is a front perspective view showing a housing of the reversing device for a motorcycle according to the present invention, FIG. 5 is a rear perspective view showing the housing of the reversing device for a motorcycle according to the present invention, and FIG. 6 is a perspective view showing a structure for mounting the housing of the reversing device for a motorcycle according to the present invention.

Figure 7:
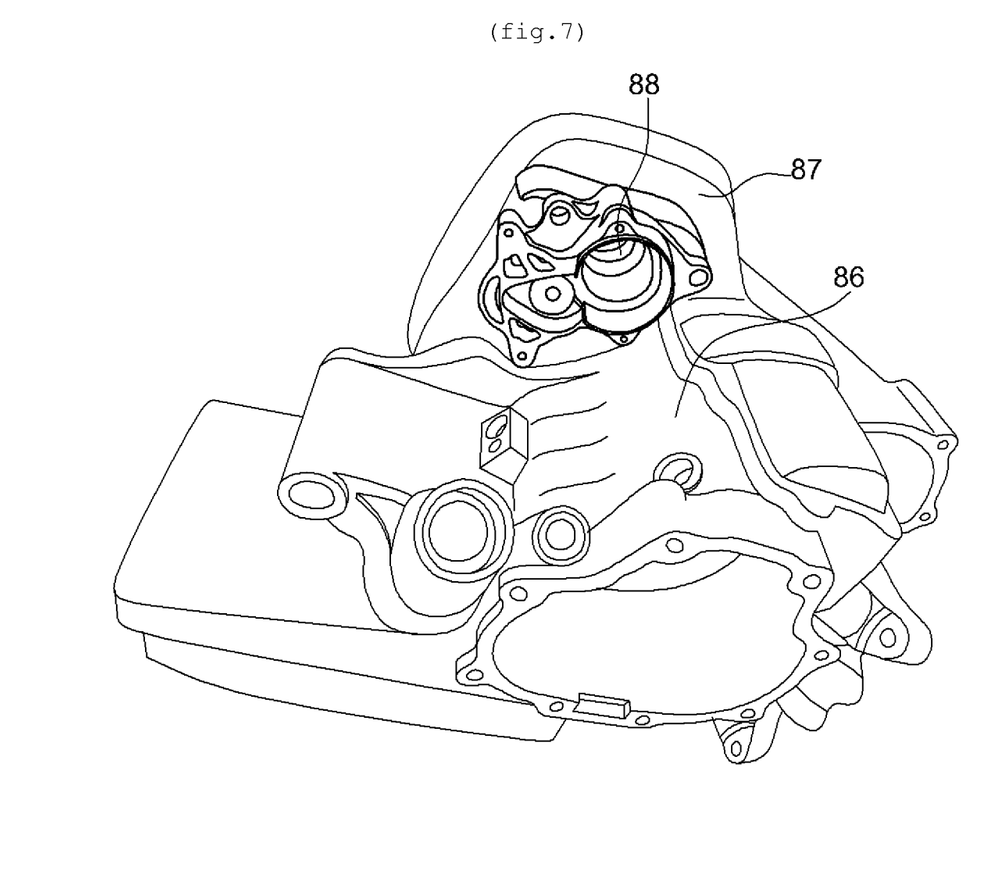
FIG. 7 is a perspective view showing a primary chain case on which the reversing device for a motorcycle according to the present invention is installed.
Figure 8:
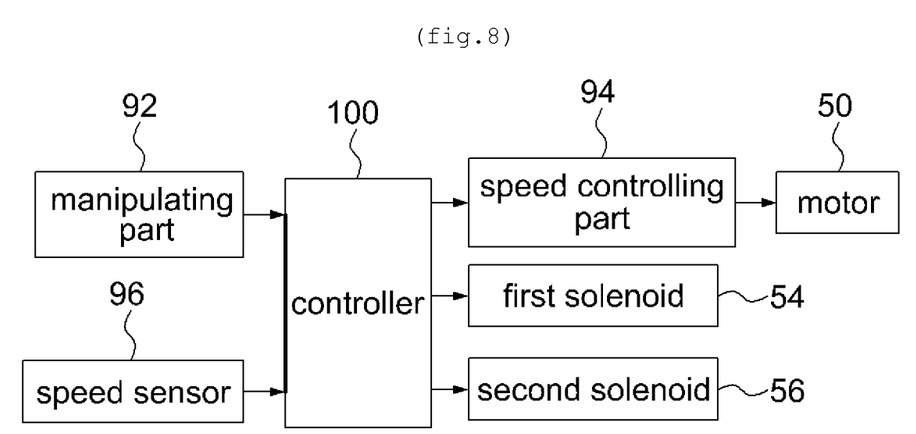
FIG. 8 is a block diagram showing the reversing device for a motorcycle according to the present invention.

Furthermore, FIG. 7 is a perspective view showing a primary chain case on which the reversing device for a motorcycle according to the present invention is installed, and FIG. 8 is a block diagram showing the reversing device for a motorcycle according to the present invention.

As shown in FIGS. 1 to 8, a reversing device for a motorcycle according to the present invention includes: a housing 10 having a first output hole 11 and a second output hole 12 formed thereon; a first output shaft 20 appearing and disappearing from and into the first output hole 11 of the housing 10, transmitting starting power to a starting sprocket 84, and having a first output gear 22 mounted thereon; a second output shaft 30 appearing and disappearing from and into the second output hole 12 of the housing 10, transmitting reversing power to a rear wheel sprocket 82, and having a second output gear 32 mounted thereon; a motor 50 supplying power to the first output shaft 20 or the second output shaft 30; a first solenoid 54 supplying operating power to the first output shaft 20 to connect or separate the first output gear 22 and the starting sprocket 84 with each other or from each other; a second solenoid 56 supplying operating power to the second output shaft 30 to connect or separate the second output gear 32 and the rear wheel sprocket 82 with each other or from each other; a decelerating part 70 decelerating the power of the motor 50 to transmit the decelerated power to the second output shaft 30; and a controller 100 transmitting driving signals to the motor 50, the first solenoid 54 and the second solenoid 56 in accordance with manipulation signals inputted from a manipulating part 92.

If the motorcycle parked moves reversely to start driving or if driving a motorcycle reversely is needed on a narrow road, the manipulating part 92 mounted on a handle bar is manipulated by a driver to supply power to both of the motor 50 and the second solenoid 56, and the reversing power supplied from the motor 50 is transmitted to the rear wheel sprocket 82 through the second output shaft 30.

If the power of the motor 50 is transmitted to the rear wheel sprocket 82, the rear wheel of the motorcycle rotates reversely to make the motorcycle move reversely.

If an engine of the motorcycle is started by means of the manipulation of the manipulating part 92 at the initial time when the driver rides the motorcycle, power is supplied to the motor 50 and the first solenoid 54 in accordance with the driving signals transmitted from the controller 100.

As a result, the first output shaft 20 appears from the interior of the housing 10, so that the starting sprocket 84 disposed in the primary chain case 87 and the first output gear 22 are connected to each other, and the power supplied from the motor 50 is transmitted to the starting sprocket 84 through the first output shaft 20 and the first output gear 22, thus starting the engine.

According to the present invention, the starting power and the reversing power are selectively supplied from one motor 50, and when compared with general reversing device in which starting power and reversing power are supplied from a plurality of motors, the reversing device according to the present invention reduces the number of parts and decreases the space needed for the installation of the reversing device and the starter motor.

According to the present invention, further, the starting power and the reversing power are supplied from one motor 50 and the first and second solenoids 54 and 56 mounted on one housing 10, and therefore, the reversing device according to the present invention is mounted on a connection hole 88 of the primary chain case 87 from which the starter motor of the general motorcycle is separated, thus selectively supplying the starting power and the reversing power.

As a result, the starter motor and the housing can be removed from the general motorcycle, and the reversing device including the housing 10 according to the present invention is simply mounted, thus conducting the reversing.

The first output hole 11 protrudes outward from the housing 10 in such a manner as to be inserted into the connection hole 88 of the primary chain case 87, and accordingly, after the starter motor 50 mounted on the primary chain case 87 of the general motorcycle is removed, the first output hole 11 is inserted into the connection hole 88 to allow the primary chain case 87 and the housing 10 to be coupled to each other.

If the engine is started with the manipulation of the manipulating part 92 by the driver, a rod protrudes from the first solenoid 54 to allow the first output shaft 20 to protrude outward from the first output hole 11, so that the first output shaft 20 is inserted into the primary chain case 87 and connected to the starting sprocket 84.

After that, since the power is applied to the motor 50 in accordance with the driving signal transmitted from the controller 100, the power of the motor 50 is transmitted to the starting sprocket 84 through the first output shaft 20 and the first output gear 22, thus starting the engine.

The first output shaft 20 is longer in length than the second output shaft 30, and the first output shaft 20 is extended from the first output hole 11 in such a manner as to be inserted into the primary chain case 87.

Since the first output hole 11 protrudes outward from the housing 10, the first output shaft 20 protruding outward from the housing 10 through the first output hole 11 in such a manner as to be inserted into the primary chain case 87 is longer in length than the second output shaft 30.

Through the application of power to the first solenoid 54, if the first output shaft 20 protrudes outward from the housing 10 through the first output hole 11 and is then inserted into the primary chain case 87, the power of the motor 50 is transmitted to the first output shaft 20 and the first output gear 22 because the first output shaft 20 is connected to the starting sprocket 84, thus driving the starting sprocket 84 to conduct the starting of the engine.

The housing 10 has a guide block 17 disposed to face the second output hole 12 in such a manner as to be spaced apart from the second output hole 12 and a guide hole 18 formed on the guide block 17 in such a manner as to insert the second output shaft 30 thereinto.

The guide block 17 protrudes forward from the housing 10, and one side end portion of the guide block 17 is extended toward the second output hole 12. An opening 19 is formed between the guide block 17 and the second output hole 12 to provide a given gap between the guide block 17 and the second output hole 12

The guide block 17 has the guide hole 18 adapted to slidingly insert the second output shaft 30 protruding outward from the housing 10 through the second output hole 12 thereinto in such a manner as to support the end portion of the second output shaft 30 thereagainst.

The second output gear 32 exposed outward from the housing 10 through the gap between the housing 10 and the guide block 17, that is, through the opening 19, is connected to the rear wheel sprocket 82 disposed on the opening 19, so that the reversing power transmitted from the motor 50 is transmitted to the rear wheel sprocket 82 through the second output gear 32, thus conducting the reversing operation of the motorcycle.

Further, the housing 10 includes a first mounting groove 13 adapted to mount the motor 50 thereon, a second mounting groove 14 adapted to mount the first solenoid 54 thereon and to form the first output hole 11 thereon, and a third mounting groove 16 adapted to mount the decelerating part 70 and the second solenoid 56 thereon and to form the second output hole 12 thereon.

The first output hole 11 and the guide block 17 are formed on the outer surface of the housing 10, and the first mounting groove 13, the second mounting groove 14 and the third mounting groove 16 are formed on the inner surface of the housing 10. Further, the motor 50, the first solenoid 54, the second solenoid 56 and the decelerating part 70 are mounted on the inner surface of the housing 10, and a cover is coupled to the housing 10 to restrain the motor 50, the first solenoid 54, the second solenoid 56 and the decelerating part 70.

The first mounting groove 13, the second mounting groove 14 and the third mounting groove 16 are formed sequentially from one side end portion of the housing 10 to the other side end portion thereof, and further, they are spaced apart from each other in such a manner as to cross each other, thus reducing the total length of the housing 10.

The third mounting groove 16 includes a plurality of mounting grooves as well as the second output hole 12 so as to seat the decelerating part 70 having a plurality of gears thereonto, and the first mounting groove 13 and the second mounting groove 14 are overlaid on the end portions facing each other in such a manner as to communicate with each other.

Further, a mounting groove is separately formed between the second mounting groove 14 and the third mounting groove 16 to mount a first decelerating gear 72 and a second decelerating gear 74 transmitting the power of the second output shaft 30 to the decelerating part 70 thereonto.

The power of the motor 50 is transmitted to the second output shaft 30 through the first output shaft 20 and the decelerating part 70, and accordingly, even when the reversing power is transmitted to the second output shaft 30, the power of the motor 50 is transmitted to the second output shaft 30 through the first output shaft 20.

According to the present invention, the power transmission structure is configured in a more simple manner when compared with the conventional power transmission structure wherein the power of the motor is transmitted independently to the first output shaft 20 and the second output shaft 30. According to the present invention, further, the power of the motor 50 is decelerated while passing through a transmitting gear 24 fitted to the first output shaft 20, thus reducing the number of decelerating gears constituting the decelerating part 70.

The transmitting gear 24 fitted to the first output shaft 20 is connected to a driving gear 52 mounted on the rotary shaft of the motor 50 to transmit the power of the motor 50 to the decelerating part 70, and the transmitting gear 24 is fitted to the first output shaft 20 by means of a first spline gear 26.

The transmitting gear 24 is rotatably mounted in the second mounting groove 14 and connected to the driving gear 52 of the motor 50 and the first decelerating gear 72, so that the power of the motor 50 is transmitted to the first decelerating gear 72 through the transmitting gear 24.

The first output shaft 20 passes through the rotating center of the transmitting gear 24 in such a manner as to be extended outward from the first output hole 11, and the first output shaft 20 and the transmitting gear 24 are connected with each other by means of the first spline gear 26, so that if the power of the motor 50 is transmitted to the transmitting gear 24, the transmitting gear 24 and the first output shaft 20 rotate at the same time.

Even if the first output shaft 20 protrudes outward from the first output hole 11 by means of the operation of the first solenoid 54, accordingly, the connected state between the transmitting gear 24 and the first output shaft 20 is maintained by means of the first spline gear 26, so that the power of the motor 50 is transmitted to the starting sprocket 84 through the transmitting gear 24, the first output shaft 20, and the first output gear 22.

The decelerating part 70 includes the first decelerating gear 72 connected to the transmitting gear 24, the second decelerating gear 74 fitted to the rotary shaft of the first decelerating gear 72, a third decelerating gear 76 connected to the second decelerating gear 74, a fourth decelerating gear 77 fitted to the rotary shaft of the third decelerating gear 76, and a fifth decelerating gear 78 connected to the fourth decelerating gear 77 and connected to the second output shaft 30 by means of a second spline gear 79.

The first decelerating gear 72 and the second decelerating gear 74 are fitted to one rotary shaft, so that if the power of the motor 50 is transmitted to the first decelerating gear 72, the first decelerating gear 72 and the second decelerating gear 74 rotate at the same time. Further, the third decelerating gear 76 and the fourth decelerating gear 77 are fitted to one rotary shaft, so that they transmit the power of the motor 50, while rotating at the same time.

The first decelerating gear 72 and the second decelerating gear 74 are rotatably mounted in the mounting groove formed between the second mounting groove 14 and the third mounting groove 16, and the third decelerating gear 76 and the fourth decelerating gear 77 are rotatably mounted in a separate mounting groove formed in the third mounting groove 16.

The fifth decelerating gear 78 is rotatably mounted in the second output hole 12 in such a manner as to allow the second output shaft 30 to be passed through the rotary shaft thereof and thus inserted into the rotating center thereof.

The fifth decelerating gear 78 and the second output shaft 30 are connected with each other by means of the second spline gear 79, so that if the power of the motor 50 is transmitted to the fifth decelerating gear 78, the fifth decelerating gear 78 and the second output shaft 30 rotate at the same time, thus transmitting the reversing power to the rear wheel sprocket 82 through the second output gear 32.

When the second output shaft 30 protrudes outward from the second output hole 12 by means of the operation of the second solenoid 56, moreover, the connected state between the second output shaft 30 and the fifth decelerating gear 78 is maintained by means of the second spline gear 79, thus transmitting the power of the motor 50.

The second output shaft 30 has a locking projection 34 formed thereon and an elastic member 36 interposed between the locking projection 34 and the fifth decelerating gear 74, so that if a rod protrudes from the second solenoid 56 through the application of power to the second solenoid 56 to allow the second output shaft 30 to protrude outward from the second output hole 12, the distance between the locking projection 34 and the fifth decelerating gear 78 becomes short, thus compressing the elastic member 36.

After that, if the reversing operation is finished, the power supplied to the second solenoid 56 is cut off by means of the operation of the controller 100, and the distance between the locking projection 34 and the fifth decelerating gear 78 becomes long by means of the restoring force of the elastic member 36, so that the second output shaft 30 is inserted into the housing 10, thus allowing the second output gear 32 and the rear wheel sprocket 82 to be separated from each other.

Of course, the locking projection 34 and the elastic member 36 may be disposed even on the first solenoid 54, which can be easily conducted by those skilled in the art, and therefore, the detailed explanation and drawings will be avoided for the brevity of the description.

The controller 100 has a speed controlling part 94 adapted to control the quantity of power supplied to the motor 50 and to maintain the reversing speed of the motorcycle to a given speed, and the speed controlling part 94 is controlled with a speed signal sensed by a speed sensor 96 transmitting the speed signal to the controller 100.

When the reversing motorcycle is driven on the flat ground, upward slope, or downward slope, the rotating speed of the rear wheel may be varied, and at this time, the speed signal sensed by the speed sensor 96 is transmitted to the controller 100.

The controller 100 transmits a driving signal according to the speed signal received thereto to drive the speed controlling part 94, thus controlling the quantity of power supplied to the motor 50.

Accordingly, the rotating speed in the power outputted from the motor 50 is increased or decreased according to the rotating speed of the rear wheel, and the output of the motor 50 is controlled to allow the reversing speed of the motorcycle to be within a given set range, thus stably maintaining the reversing speed of the motorcycle.

Since the reversing speed of the motorcycle is within the given set range, it can be appropriately controlled, without being too fast or slow, so that the reversing operation can be achieved in stable and rapid manners.

A reference numeral 52a, which is not explained yet, is a converting gear 52a converting the rotating direction of the power of the motor 50 to transmit the converted rotating direction to the transmitting gear 24.

Under the above-mentioned configuration, now, an explanation on the operation of the reversing device for the motorcycle according to the present invention will be given.

First, in case where a driver rides the motorcycle and starts the engine, the manipulation signal is transmitted from the manipulating part 92 to the controller 100, and accordingly, power is supplied to the motor 50 and the first solenoid 54 by means of the driving signal transmitted from the controller 100, while power supply to the second solenoid 56 is being cut off.

If the power is supplied to the first solenoid 54, the rod protrudes from the first solenoid 54 to allow the first output shaft 20 to protrude outward from the housing 10 through the first output hole 11, so that the first output shaft 20 is inserted into the primary chain case 87, thus connecting the starting sprocket 84 and the first output gear 22 with each other.

At this time, if the power is applied to the motor 50, the power of the motor 50 is transmitted to the starting sprocket 84 through the driving gear 52, the transmitting gear 24, the first spline gear 26, the first output shaft 20 and the first output gear 22, thus starting the engine.

Under the above-mentioned operation, the motorcycle is driven with the started engine, and during the driving, if reversing operation is needed, a reversing signal is transmitted to the controller 100 through the manipulation of the manipulating part 92 mounted on the handle bar of the motorcycle.

After that, power is supplied to the second solenoid 56 and the motor 50 by means of the driving signal transmitted from the controller 100, while power supply to the first solenoid 54 is being cut off.

Accordingly, the power of the motor 50 is transmitted to the decelerating part 70 through the driving gear 52, the converting gear 52a, the transmitting gear 24 and the first decelerating gear 72. At this time, since the first output shaft 20 is inserted into the housing 10, it rotates by means of the transmission of the power of the motor 50 thereto through the transmitting gear 24, but since the first output gear 22 and the starting sprocket 84 are separated from each other, the starting is not conducted.

The power of the motor 50 transmitted to the decelerating part 70 is transmitted to the second output shaft 30 through the second decelerating gear 74, the third decelerating gear 76, the fourth decelerating gear 77 and the fifth decelerating gear 78, and since the second output shaft 30 protrudes outward from the housing 10 by means of the rod protruding from the second solenoid 56, the second output gear 32 and the rear wheel sprocket 82 are connected to each other, thus transmitting the power of the motor 50 to the rear wheel sprocket 82.

The reverse driving of the motorcycle is conducted by means of the power of the motor 50 transmitted to the rear wheel sprocket 82.

At this time, the speed signal sensed by the speed sensor 96 is transmitted to the controller 100, and the driving signal is transmitted to the speed controlling part 94 from the controller 100 according to the speed signal transmitted to the controller 100, so that the quantity of power supplied to the motor 50 is controlled to allow the rotating speed of the rear wheel to be within a given set range.

Accordingly, the motorcycle can be driven at a constant reversing speed even when it is driven on the flat ground, upward slope, or downward slope, thus achieving the reversing in safe and rapid manners.

If the reverse driving of the motorcycle is converted into forward driving through the driver's manipulation of the manipulating part 92 after the reverse driving has been finished, the power supplied to the second solenoid 56 is cut off, so that the second output shaft 30 is inserted into the housing 10 by means of the restoring force of the elastic member 36 to allow the second output gear 32 and the rear wheel sprocket 82 to be separated from each other, thus converting the reverse driving of the motorcycle into forward driving.

Accordingly, the reversing device according to the present invention is disposed on the connection hole of the primary chain case from which the starter motor of the general motorcycle is separated, thus selectively supplying the starting power and the reversing power.

Further, the reversing device according to the present invention is applied for a motorcycle, but the reversing device and the method for controlling the same can be applied for other products.

While the present invention has been described with reference to the particular illustrative embodiments, it is not to be restricted by the embodiment but only by the appended claims. It is to be appreciated that those skilled in the art can change or modify the embodiments without departing from the scope and spirit of the present invention.

The invention claimed is:
1. A reversing device for a motorcycle comprising:
a housing having a first output hole and a second output hole formed thereon, the first output hole protruding outward from the housing in such a manner as to be inserted into a connection hole of a primary chain case;

a first output shaft slidably disposed in the first output hole, the first output shaft including a first output gear which is engaged with a starting sprocket to transmit starting power to the starting sprocket;

a second output shaft slidably disposed in the second output hole, the second output shaft including a second output gear which is engaged with a rear wheel sprocket to transmit reversing power to the rear wheel sprocket;

a motor supplying power to the first output shaft or the second output shaft;

a first solenoid installed at the first output shaft and including a first rod protruding from the first solenoid, the first rod allowing the first output shaft protruding outward from the first output hole;

a second solenoid installed at the second output shaft and including a second rod protruding from the second solenoid, the second rod allowing the second output shaft protruding outward from the second output hole;

a decelerating part decelerating the power of the motor to transmit the decelerated power to the second output shaft; and a controller transmitting a driving signal to the motor, the first solenoid or the second solenoid being selectively operated by the controller associated with the first input shaft and the second input shaft in accordance with a forward driving or a reverse driving of the motorcycle, wherein the forwarding and reversing driving is operated with respect to the first and second output shafts and the first and second solenoids with the following mechanism:

in response to receipt of a forward driving signal, electric power is supplied to the first solenoid and the first output shaft protrudes outward from the first output hole by the first rod such that the first output gear is engaged with the starting sprocket, and in response to receipt of a reverse driving signal, the electric power supplied to the first solenoid is cut off and the first output shaft is inserted into the first output hole such that the first output gear is disengaged from the starting sprocket, in response to receipt of the reverse driving signal, the electric power is supplied to the second solenoid and the second output shaft protrudes outward from the second output hole by the second rod such that the second output gear is engaged with the rear wheel sprocket, and in response to receipt of the forward driving signal, the electric power supplied to the second solenoid is cut off and the second output shaft is inserted into the second output hole such that the second output gear is disengaged from the rear wheel sprocket, and wherein the housing includes a guide block disposed to face the second output hole in such a manner as to be spaced apart from the second output hole, the guide block having a guide hole into which end portion of the second output shaft is inserted when the second output shaft protrudes outward from the second output hole such that the guide block supports the end portion of the second output shaft.

2. The reversing device for a motorcycle according to claim 1, wherein the first output shaft is longer in length than the second output shaft, and the first output shaft is extended from the first output hole in such a manner as to be inserted into the transmission primary case.

3. The reversing device for a motorcycle according to claim 1, wherein the housing comprises a first mounting groove adapted to mount the motor thereon, a second mounting groove adapted to mount the first solenoid thereon and to form the first output hole thereon, and a third mounting groove adapted to mount the decelerating part and the second solenoid thereon and to form the second output hole thereon.

4. The reversing device for a motorcycle according to claim 1, wherein the power of the motor is transmitted to the second output shaft through the first output shaft and the decelerating part.

5. The reversing device for a motorcycle according to claim 1, wherein the first output shaft has a transmitting gear fitted thereto in such a manner as to connected to a driving gear mounted on the rotary shaft of the motor to transmit the power of the motor to the decelerating part, and the transmitting gear is fitted to the first output shaft by means of a first spline gear.

6. The reversing device for a motorcycle according to claim 1, wherein the controller comprises a speed controlling part adapted to control the quantity of power supplied to the motor and to maintain the reversing speed of the motorcycle to a given speed, and the speed controlling part is controlled with a speed signal sensed by means of a speed sensor transmitting the speed signal to the controller.

7. The reversing device for a motorcycle according to claim 5, wherein the decelerating part comprises:
a first decelerating gear connected to the transmitting gear;
a second decelerating gear fitted to the rotary shaft of the first decelerating gear;
a third decelerating gear connected to the second decelerating gear;
a fourth decelerating gear fitted to the rotary shaft of the third decelerating gear; and
a fifth decelerating gear connected to the fourth decelerating gear and connected to the second output shaft by means of a second spline gear.

8. The reversing device for a motorcycle according to claim 7, wherein the second output shaft has a locking projection formed thereon and an elastic member interposed between the locking projection and the fifth decelerating gear.

* * * * *